July 15, 1947.      B. H. C. MATTHEWS      2,424,178
APPARATUS FOR EFFECTING NAVIGATIONAL CALCULATIONS
Filed Feb. 14, 1945      3 Sheets-Sheet 1
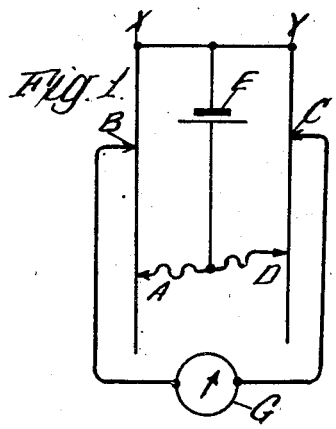
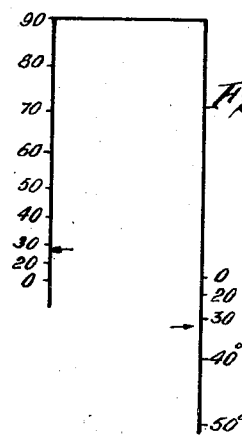
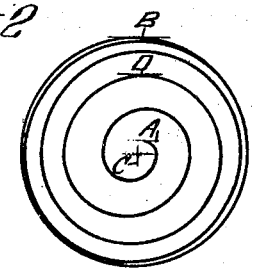
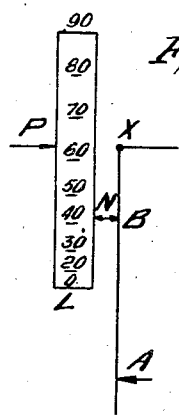
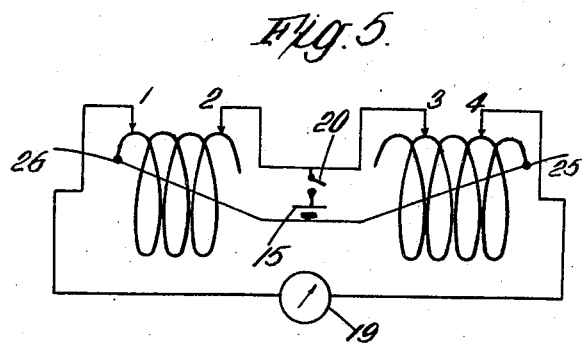
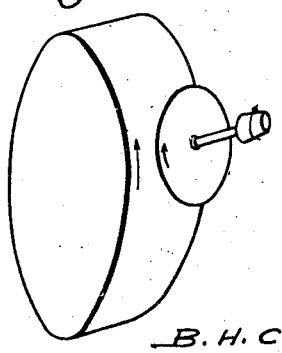
INVENTOR
B. H. C. MATTHEWS

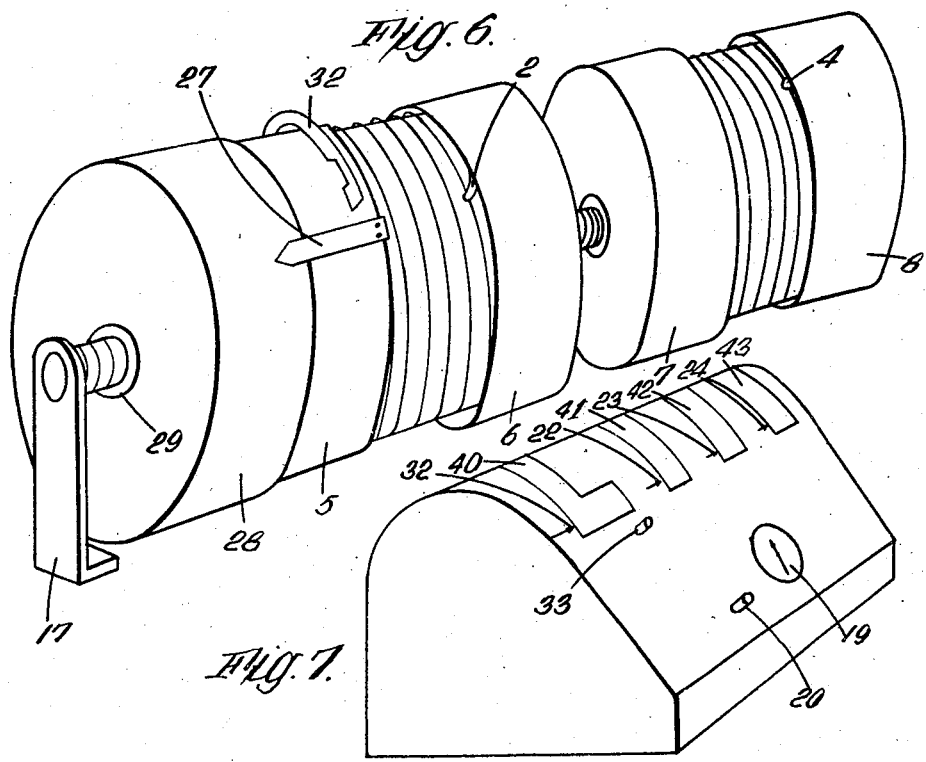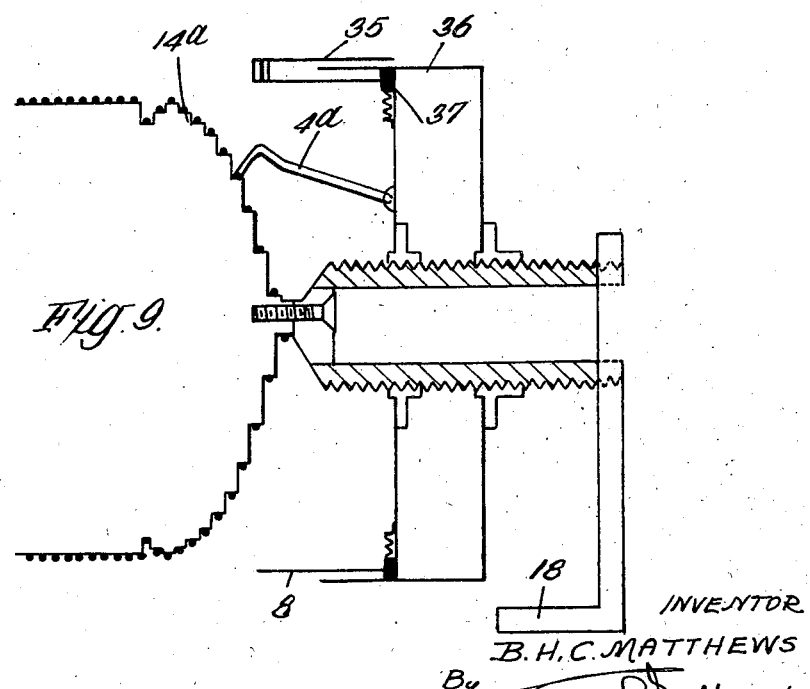

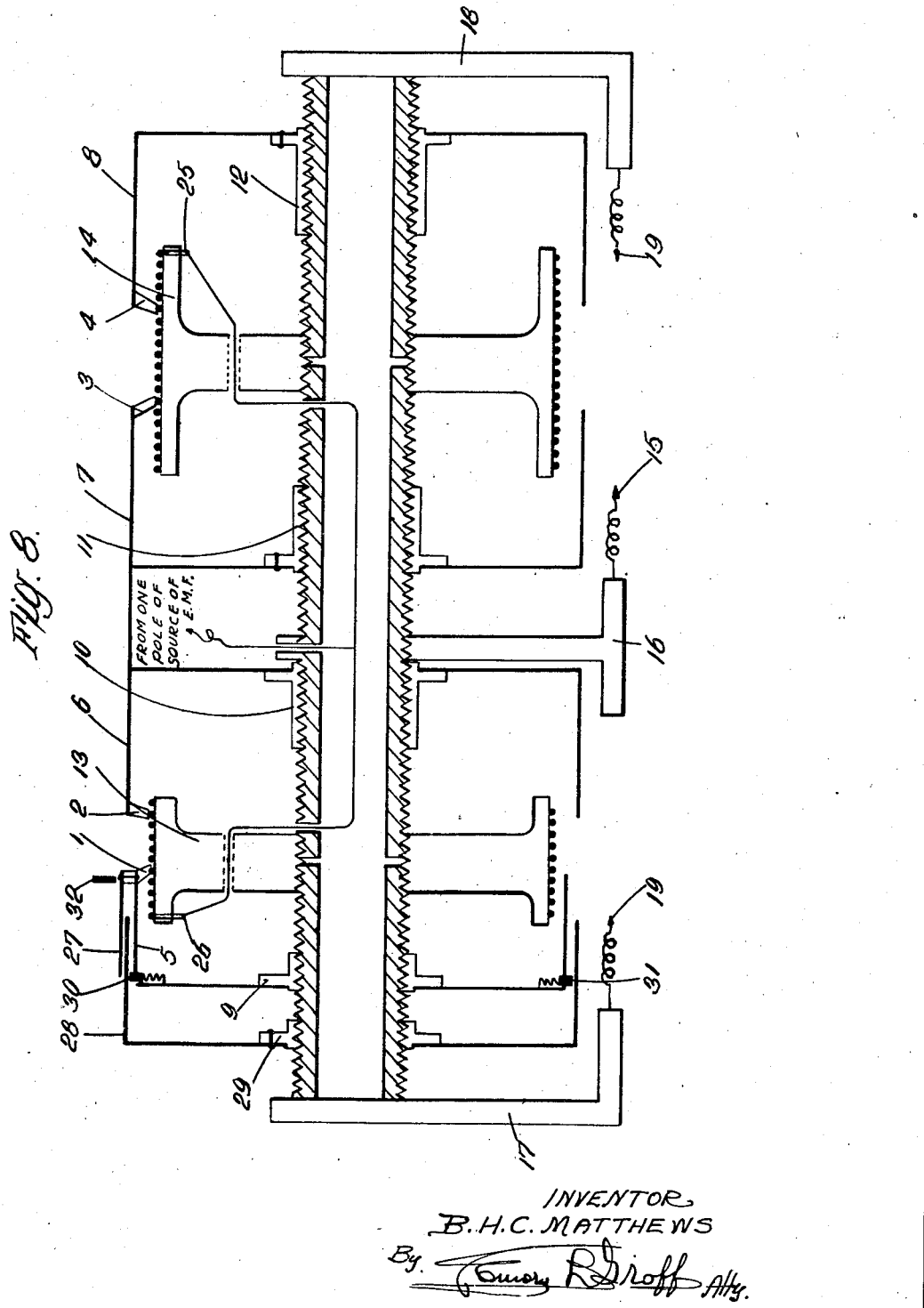

Patented July 15, 1947

2,424,178

UNITED STATES PATENT OFFICE 2,424,178

APPARATUS FOR EFFECTING NAVIGATIONAL CALCULATIONS

Bryan Harold Cabot Matthews,
Cambridge, England

Application February 14, 1945, Serial No. 577,802
In Great Britain February 23, 1944

5 Claims. (Cl. 235—61)

This invention relates to the making of mathematical calculations for navigational and other purposes which involve the solution of spherical triangles, and has for its object to provide a method and apparatus whereby such calculations may be easily and rapidly made without the use of mathematical tables.

A special object is to provide an instrument to automatically calculate zenith distance or local hour angle from an equation commonly used in celestial navigation, to thereby give the intercept to lay down a position line on a chart, wherein intercept is the difference between observed and calculated values.

For example, in determining position from observation of a heavenly body it is required to solve an equation relating the following four angles, namely the hour angle between the observer's meridian and the meridian of the heavenly body observed, the latitude of the observer, the declination of the heavenly body, and its zenth distance from the observer's zenith. These are related according to the equation commonly used as follows:

(I) $$\text{Haversine hour angle} = \frac{\text{haversine zenith distance} - \text{haversine (difference co-latitude and polar distance)}}{\text{sine co-latitude} \times \text{sine polar distance}}$$

In the above equation, co-latitude=$90° \pm$ latitude and polar distance=$90° \pm$ declination.

According to the invention an equation of the above form or a transformation of such equation is solved by applying an E. M. F. to two pairs of adjustable resistances or equivalent electrical devices in parallel, representing the appropriate derivations of the four angles of a spherical triangle, and adjusting the devices to electrical balance with the three known derivations so that the unknown quantity is given by the adjustment of the fourth device.

According to a further feature of the invention a E. M. F. is applied to two potentiometers or adjustable resistances in parallel through two movable contacts controlling the voltage drop in the resistances, and a further movable contact on each resistance connected to an indicator or galvanometer, the said contacts being used to relate the appropriate derivations referred to in the preceding paragraph.

According to a further feature of the invention the adjustable resistances or equivalent electrical devices are provided with scales so arranged that when the scale is set to an angle the device is set to a position such that the resistance or equivalent electrical quantity is proportional to the sine, cosine, 1—cosine, or secant of the angle indicated on the scale.

According to an alternative arrangement the adjustable resistances or equivalent devices have a spiral or equivalent characteristic so that with a uniform scale of angles the position of the device is proportional to the sine, cosine, 1—cosine or secant of the angle indicated by the scale.

According to a further feature of the invention a quantity representing the difference of the derivations of two angles is obtained by providing a moving contact having an index movable over a scale which is itself movable with respect to a fixed index.

The resistance elements may conveniently be wound on cylindrical supports, and engaged by contact members rotatable about the said supports. The contact members may be carried by drums, rotatable upon threaded shaft elements, the pitch of the threads being the same as that of the turns of resistance wire, so that proper contact is maintained. The drums carry scales which are associated with fixed index members, and these latter may be convieniently be provided on a casing which houses the drums.

Referring to the accompanying drawings in which the principles and various modes of carrying the invention into effect are illustrated by way of example;

Figure 1 is a diagram showing the principle upon which the invention is based;

Figure 2 is a diagram showing the general form of a pair of contact scales;

Figure 3 is a diagram of a helical or spiral resistance;

Figure 4 is a diagram showing another form of contact scale;

Figure 5 shows diagrammatically the general arrangement of an apparatus constructed according to the invention;

Figure 6 is a perspective view of the drum assembly;

Figure 7 is a perspective view of the outside of the complete apparatus;

Figure 8 is a longitudinal section taken through the drum assembly;

Figure 9 is a part longitudinal section of an alternative form of contact drum;

Figure 10 is a diagram showing a friction drive for the contact drums.

In considering the various modes of carrying the invention into effect it will be convenient first to discuss the principles involved. The equation given at (I) above for determining position from observation of a heavenly body may be transposed and written thus:

(II)
$$\frac{1-\text{cosine hour angle}}{\text{secant latitude}} = \frac{\text{cosine (difference co-latitude and polar distance)} - \text{cosine zenith distance}}{\text{cosine declination}}$$

The above equation is of the general form $$\frac{a}{b} = \frac{c}{d}$$

Referring now to Fig. 1, let X and Y represent two resistances each provided with a pair of movable contacts A, B and C, D respectively. A source of E. M. F. E has one pole connected to one end of the resistances and the other to the common point of the contacts A and D. It follows that the potential difference between B and X and C and Y will respectively be the fractions $$\frac{\text{resistance } BX}{\text{resistance } AX} \text{ and } \frac{\text{resistance } CY}{\text{resistance } DY}$$

of the applied E. M. F. If the contacts B and C are joined by a galvanometer G, this will be undeflected only when B and C are equipotential, when the following relation obtains:

(III) $$\frac{\text{resistance } CY}{\text{resistance } DY} = \frac{\text{resistance } BX}{\text{resistance } AX}$$

This is true as long as BX is less than AX and CY is less than DY.
Also $$\frac{BX}{AB} = \frac{CY}{CD}$$

If now the quantities of Equation II be substituted in Equation III so that the resistance CY be made proportional to 1−cosine hour angle, DY to secant latitude, and AX to cosine declination, then the galvanometer will be undeflected only when BX is in the same proportion to cosine (difference latitude and polar distance) minus cosine zenith distance. Under these conditions both Equations II and III are satisfied.

It will be appreciated from the above considerations that when three of the resistances are set to the appropriate derivations of three known angles, and the fourth is set so that the galvanometer is undeflected, the fourth will then represent the appropriate derivation of the fourth angle of a spherical triangle.

Thus an instrument comprising two suitable rheostats each having two pairs of contacts, together with a source of E. M. F. and an indicating instrument may be so constructed that navigational problems may be solved directly without the use of mathematical tables.

There are two convenient and practical methods whereby the appropriate relation between scale readings of angle and the resistance between a moving contact and one end of a rheostat may be realized. In one arrangement the contact may move along a uniform element such as a wire and the position of the contact may be indicated on a scale of degrees and subdivisions which are so placed that the resistance between one end of the wire and the movable contact is some suitable multiple of the cosine, 1−cosine, or secant of the angle indicated. Such an arrangement is shown diagrammatically in Figure 2, where the left-hand scale represents 1−cosine and the right-hand scale the secant. It may be noted that as the secant of 90° is infinity the scale must stop short of this.

According to the other arrangement the position of the contact is indicated on a uniform or linear scale of degrees and subdivisions, and the rheostat is constructed so that the resistance from one end is a suitable multiple of the cosine, 1−cosine, or secant of the angle indicated. This may be done by giving a rheostat element of uniform cross-section a helical or spiral form as shown in Figure 3. To give a cosine or 1−cosine relation between scale and resistance, the spiral is formed so that the radius at any point from a fixed centre C bears a constant relation to $\sin \theta$, where $4n\theta$ is the angle from the centre to this point and $\theta$ is the angle indicated on the scale, $n$ being the number of turns. The contact is arranged to touch the spiral at right angles to the radius at the point of contact, and is rotated relative to the spiral. If A be the contact position for scale reading 0° (i. e. $4n\theta = 0$) and the resistance from $A = 0$ and the resistance from B for scale reading 90° has some value R, then it may be shown by the integral calculus and polar co-ordinates that at any intermediate position D: Resistance A to $D = R(1 - \cos \theta)$ and resistance B to $D = R \sin (90° - \theta) = R \cos \theta$ to a very close approximation.

The first of the above methods may be used alone or in combination with the second, if it is desired to obtain a linear scale disposition for one or more of the angles, as will be described later.

The use of the second method may be preferred for that portion of the resistance associated with the contact C in Figure 1, representing the hour angle which is the algebraic sum of the observer's longitude, the time, and the right ascension of the body observed. In some applications it is convenient to separate one of these quantities from the others which can readily be done with the use of linear scales. The quotient in Equation II, cosine (difference co-latitude and polar distance) minus cosine zenith distance, requires subtraction of derivations of two angles to give the appropriate quantity for substitution in Equation III. This may be achieved as shown in Figure 4, where the moving contact B has an index N moving over a scale L, the scale being itself movable and associated with a fixed index P so placed that when both indices are at zero the contact B is at X and the resistance is also zero. It will be seen that with a suitable disposition of the scale markings, if N be set to the difference co-latitude and polar distance and M be set to the zenith distance, the resistance of BX will be a fixed multiple of the cosine (difference co-latitude and polar distance) minus the cosine zenith distance, for any value of these angles. It may be noted that in a spherical triangle the second of these cosines is always less than the first.

In carrying the invention into effect in accordance with one convenient mode, the arrangement of the resistances is shown diagrammatically in Figure 5 and the construction of the apparatus is shown in Figures 6, 7 and 8. The resistances are formed by turns of suitable wire wound on suitable supporting members. There are four contacts 1, 2, 3, and 4 which are carried on drums, 5, 6, 7 and 8 mounted on nuts 9, 10, 11 and 12 which are threaded rotatably on fixed screwed shafts. The shaft threads are of the same pitch as the turns of resistance wire on the cylindrical formers 13, 14, so that as the drums are rotated they and the contacts move laterally and contact may be made with any part of any turn of the resistance wire on the formers which are fixed. Connection is made by a conductor between each contact and the appropriate nut, and so to the threaded shafts. The nuts 10, 11 thus serve to connect contacts 2, 3 to each other by way of the central shaft and to one pole of the battery 15 by way of the central support 16. Similarly connection is made between contacts 2, 3 to each other by way of the central shaft and to one pole of the battery 15 by the support 16. Similarly connection is made between contacts 1 and 3 by way of the two end shaft sections and the end supporting brackets 17 and 18 to the two terminals of the galvanometer 19. The outer ends of the coils on formers 13 and 14 are connected to insulated wires which are carried through holes in the shaft sections to make contact with each other and with the switch 20 by which connection is made with the second pole of the battery or other source of E. M. F.

The drums 6, 7 and 8 each carry a scale of degrees and subdivisions following the same pitch as the shaft threads, so that as these drums are rotated the contact and scale also move laterally in phase. The scales are read against fixed indices 22, 23 and 24 carried on a case which covers the assembly of drums (see Figure 7).

According to one convenient arrangement the scale on drum 8 reads 90° after ten turns of the drum from zero (when the contact 4 is at the outer end of the winding) and intermediate markings are so placed that when any angle $\theta$ is opposite the index 24 the drum is $10 \times (1 - \cos \theta)$ turns from zero. This scale continues above 90° with markings that are symmetrical with those below 90° and in this way hour angles in excess of 90° can be accommodated. The scale on drum 7 is given a disposition such that the resistance from contact 3 to the end 25 of the winding is proportional to the secant of the angle indicated. Similarly the drum 6 carries a scale such that the resistance between contact 2 and the end 26 of the winding is proportional to the cosine of the angle indicated.

The drum 5 is not provided with a scale, but carries an index 27 which projects over a fifth drum 28 carried by a nut 29 in the same way as the other drums. The drum 28 carries a scale of degrees and subdivisions following a 1— cosine law. Thus if the number of turns from 0° to 90° on the scale equals $x$, then the number of turns from 90° to $a°$ on the scale equals $x \sin (90-a)$.

The drum 28 is arranged to turn the drum 5 when the former is rotated by the friction of interposed members 30 and 31 (see Figure 8). A catch 32 is provided for holding the drum 5 stationary when required, and when this is done the drum 28 may be moved relatively to drum 5 against the friction of the members 30 and 31. It will be appreciated by reference to Figure 4 that if the index 27 is set to an angle $x°$ and the scale is set against a fixed index 32 (Figure 7) to an angle $y°$, then the resistance from contact 1 to the end of the winding will be proportional to cosine $y°$ — cosine $x°$.

As previously mentioned the assembly of drums is housed in a case with fixed indices 32, 22, 23 and 24 and windows 40, 41, 42 and 43 through which the scales may be read are provided. The case is also fitted with a switch 20 and a galvanometer 19. To protect the galvanometer from damage should it be subjected to the full E. M. F. of the battery, as may occur if drums 5 and 8 are at the opposite ends of their scales, some suitable device is provided, for example two copper oxide rectifiers shunted across it in opposite senses, or some form of cut-out.

The windows 40, 41, 42 and 43 in the case are in the form of slots as shown in Figure 7 to enable the drums to be rotated by the fingers. The index 27 on the drum 5 is set by engaging it opposite the window 40 by means of the catch 32, which is actuated by means of a button 33 extending through the case.

In operating the apparatus, for example to determine longitude, the drums 6 and 7 are set to latitude and declination. It is immaterial which is set on which drum, but for the greatest accuracy the larger quantity should be set on drum 7. The index 27 is set to the difference of latitude and declination, with due regard to their sign north or south of the equatorial plane. Thus if one is north and the other south they are added, but if both are north or south the less is subtracted from the greater. The drum 28 is set to the observed zenith distance and the switch 20 having been closed, the drum 8 is rotated until the galvanometer is undeflected, when the setting of this drum is read against the index 24 through window 43. This is the hour angle of the heavenly body observed from which the longitude is determined in the usual manner.

Alternatively if the hour angle is known this may be set on the drum 8 and the drum 28 rotated until there is no deflection on the galvanometer, the calculated zenith distance thus obtained being used to determine a line of position by intercept according to the commonly used method.

As the instrument of the present invention represents the ratios of two angular functions by the ratio of two resistances in each of the two potentiometers of which it is composed, it will be appreciated that the absolute value of these resistances is quite unimportant in the functioning of the instrument.

In this particular embodiment each potentiometer has 10 turns of Nichrome wire 30 gauge between the contact 2 (see Fig. 5) and the end 26 and between contact 3 and end 25, when the scales on drums 6 and 7 (Fig. 6) are set so that 0° appears at the indices 22 and 23 (Fig. 7). Under these circumstances, resistance 26—2 and 25—3, Fig. 5 equals 30 ohms. Any convenient wire may be used in the construction of the potentiometers, with wide variation in resistance from that given without in any way affecting the computation.

*Example 1.*—A heavenly body of declination 20° 30′ N. is observed to have an altitude of 32° 51′ (zenith distance 57° 9′). Local hour angle of the body is 54° 12′, assumed latitude of observer 42° 17′ N.

Required the calculated zenith distance to give the intercept to lay down a position line on a chart.

A. Rotate drum 8 (Fig. 6) so that L. H. A.=54° 12′ appears opposite index 24 (Fig. 7). The disposition of scale on this drum follows sine-cosine law, and markings are such that distances on the scale from 0° to any marked angle are proportional to 1—cosine =(versine) of that angle. Now 0° to 90° (10 turns) in the instrument illustrated=30 ohms on the potentiometer wire. Hence since versine 54° 12′=0.4150. Resistance 4—25 (Fig. 5) =30×0.4150=12.450 ohms.

B. Rotate drum 7 Fig. 6) so that index 23 (Fig. 7) stands at latitude 42° 17′. This scale has secant law disposition of markings and again sec. 0=1.000 and is represented by 10 turns=30 ohms of the potentiometer. Since secant 42° 17′=1.352. Resistance 3—25 (Fig. 5)

$$=30 \times 1.352 = 40.56$$

ohms.

C. Rotate drum 6 (Fig. 6) so that declination 20° 30' is opposite index 22 (Fig. 7). Since this scale follows cosine law, and cos 0°=1.000 is represented by 10 turns=30 ohms of potentiometer. Resistance 2—26 (Fig. 5)=30×0.9367=28.101 ohms. (Since cos 20° 30'=0.9367.) Set index 27 (Fig. 6) on the scale of drum 28 (Fig. 6) to latitude—declination=42° 17'—20° 30'=21° 47'. Close circuit by switch 20 (Fig. 5) and rotate drum 28 (Fig. 6) (which carries drum 5 with it by means of friction members 30 and 31) until the galvanometer 19 (Fig. 5) reads zero.

Now by applying Ohm's law it will be seen that

Resistances (Fig. 5)

$$\frac{26-1}{26-2}=\frac{4-25}{3-25}$$

Substituting values above $$\frac{26-1}{28.101}=\frac{12.450}{40.56}$$

Resistance 26—1=8.625 ohms.

D. Referring now to Fig. 4. XB=8.625 ohms. The whole scale on drum 28 (Fig. 6) 0° to 90° is represented by 10 turns=30 ohms on the potentiometer. The scale follows cosine law.
Hence Resistance $$\frac{XB}{30}=(\text{Fig. 4})=\text{cosine angle at index N}-$$

cosine angle at index P

Cosine 21° 47'=0.92859
Substituting $$\frac{8.625}{30}=0.92859-\cos\text{ angle at index P}$$

Cosine=0.64109 and angle at index P=57° 7'

It will be apparent that this will be the value appearing at index 32 (Fig. 7) and is the required zenith distance. Observed zenith distance was 57° 9', intercept is difference between observed and calculated values=2'. Position line lies 2 nautical miles towards the heavenly body from the assumed position.

*Example 2.*—An observer in latitude 10° 15' North, observes a heavenly body having declination 15° 31' South to have an altitude of 25° 37' (zenith distance 64° 23'). Required the local hour angle of the body for longitudinal determination.

Index 27 (Fig. 6) is set to latitude+declination=25° 46' zenith distance 64° 23' is set against index 32 (Fig. 7). Then as explained at paragraph D above.

Resistance 26—1 (Fig. 5) =30×(cosine 25° 46'
—cosine 64° 23')
=30×0.46822
=14.0466 ohms Declination 15° 31' is set against index 22 (Fig. 7)

As explained at paragraph C above

Resistance 26—2 (Fig. 5) =30×cosine 15° 31'
=30×0.96355
=38.9065 ohms

Latitude 10° 15' is set opposite index 23 (Fig. 7)

As explained in paragraph B above

Resistance 25—3 (Fig. 5) =30×secant 10° 15'
=30×1.016
=30.48 ohms

Switch 20 (Fig. 5) is closed and drum 8 (Fig. 6) rotated until galvanometer 19 (Fig. 5) reads zero.

Applying Ohm's law $$\frac{26-1}{26-2}=\frac{25-4}{25-3}$$

Substituting values above $$\frac{14.0466}{28.9065}=\frac{25-4}{30.048}$$

Resistance 25—4=14.60 ohms.

As explained at A above. 0° to 90° on drum 8, occupies 10 turns and is represented by 30 ohms on the potentiometer. Scale follows sin—cos law and any angle lies a distance from 0° proportional to the versine of that angle. Hence angle standing at index 24 (Fig. 7) is that having a versine=

$$\frac{14.60}{30}=0.48666$$

That is angle=59° 7'

This is the local hour angle required.

It will thus be seen that the scales having marks disposed according to the functions of the angles marked on them, set the resistances to values proportional to these functions. The ratios of these functions are then equated electrically by Ohm's law. As only these ratios determine the functioning of the instrument, the absolute values of the resistances are immaterial and may be varied to suit constructional convenience.

According to a modified form of the apparatus previously described, the drums are rotated from outside the casing, which is completely closed to prevent the entry of dust. One method of effecting a drive of this kind is shown diagrammatically in Figure 10, where a known type of right-angled friction gear is carried in bearings mounted in the case and actuated by a knob on a shaft extending to the outside of the case.

According to a further modification of the apparatus, the resistance winding engaged by the contact 4 on the drum 8 is disposed in the form of a spiral as has previously been described in connection with Figure 3. In this arrangement the drum 14 of Figure 8 is modified to carry the spiral as shown at 14ᵃ in Figure 9. The drum 8 carries a hinged contact 4ᵃ which is arranged to touch the resistance wire at right angles to the radius of the wire at any point thereon. An index 35 carried by the drum 8 moves over a sixth drum 36, and frictional devices 37 form a connection between the drum 8 and the drum 36. A linear scale of degrees or hours and subdivisions is provided on the drum 36, and by setting the index 35 on this scale and setting the scale against a fixed index the addition or subtraction of these settings is obtained in the rotation imparted to the drum 8 and so in the resistance between the contact 4 and the end of the resistance wire.

It will be understood that the apparatus according to the invention is applicable generally to problems which require the solution of a spherical triangle and may be used for example to determine the distance and great circle course between two places on the earth's surface of known latitude and longitude, or to determine the azimuth of a known heavenly body.

According to a further modification, the drum used for settings of declination may in addition or alternatively to a scale of degrees carry markings with the names of stars used in navigation at the scale positions appropriate to their declinations, or it may carry a scale of dates and times appropriate to the declination of the sun for the current year.

In an alternative mode of carrying the invention into effect where less accuracy is required there may be provided four independent resistances representing the same derivations of angular quantities as in the arrangements previously described, the resistances being connected and balanced in the manner of a Wheatstone bridge.

In place of resistances other equivalent electrical devices may be used, for example the angular derivations may be represented by the electrical capacity of four condensers which are connected in a similar bridge circuit and fed with alternating current, a suitable indicating instrument being used to obtain balance.

I claim:

1. Apparatus for effecting navigational calculations by solving a spherical triangle the four angles of which are represented trigonometrically by the equation;

$$\frac{1-\cos \text{ hour angle}}{\sec \text{ latitude}} = \frac{\cos (\text{latitude} \pm \text{declination}) - \cos \text{ zenith distance}}{\cos \text{ declination}}$$

including two wound resistors connected in parallel to a source of E. M. F., one movable contact for each resistor controlling the voltage drop in the said resistors connected from opposite poles of said source, two other movable contacts one tapping from each resistance to a galvanometer, movable scales with one of said contacts mounted on each of them, said scales being marked with known derivations of angles and being movable along threaded members having a pitch in phase with the pitch of the resistor windings, whereby the resistance values between movable contact settings on each resistor is proportional to the sine, cosine, 1—cosine or secant of the angle to which the scale is set, and means for calculating zenith distance from the numerator cos. (latitude±declination)—cos. zenith distance after setting the scales to known derivations of angles for the other parts of the equation, whereby line of position may readily be determined without the use of mathematical tables.

2. Apparatus for solving a spherical triangle mounted in a housing comprising twin resistance elements connected in parallel to a source of E. M. F., terminals connected to the opposite ends of each of said resistances from one pole of the source and terminals with movable contacts for engaging with each of said resistances from the other pole of the source, a galvanometer for indicating a balanced circuit having a pair of terminal contacts each being movable along one of each of the said resistance elements with respect to the first mentioned movable contacts in the manner of twin potentiometers, said contacts being mounted on trigonometrically calibrated scales rotatably adjustable with respect to fixed index points according to the angular derivations of three known trigonometrical functions of the equation;

$$\frac{1-\cos \text{ hour angle}}{\sec \text{ latitude}} = \frac{\cos (\text{latitude} \pm \text{declination}) - \cos \text{ zenith distance}}{\cos \text{ declination}}$$

each of the three scales for said three known functions of the equation when rotated being adapted to impart movement of one of said movable contacts along said resistances, means calibrated to regulate the turning of the scales and their respective contacts as a function of the number of windings for each resistance, and answer calculating means including a rotatable fourth scale, one of said contacts being connected to said galvanometer and mounted on a rotatable element for movement along one of said resistances with respect to another movable contact on said same resistance connected to said E. M. F. and movable along said same resistance, said rotatable element including an index pointer overlapping the said fourth scale, means for holding said rotatable element in fixed position until said fourth scale is set to a determined value in terms of latitude±declination, and means adapted to effect a driving couple between said fourth scale and said rotatable element, whereby said scale, said element and said last mentioned galvanometer contact may be jointly moved on one of said resistances until the galvanometer reads zero.

3. Apparatus for effecting navigational calculations by solving a spherical triangle the four angles of which are represented trigonometrically by the equation;

$$\frac{1-\cos \text{ hour angle}}{\sec \text{ latitude}} = \frac{\cos (\text{latitude} \pm \text{declination}) - \cos \text{ zenith distance}}{\cos \text{ declination}}$$

including two wound resistors connected in parallel to a source of E. M. F., one movable contact for each resistor controlling the voltage drop in the said resistors connected from opposite poles of said source, two other movable contacts one tapping from each resistance to a galvanometer, movable scales with one of said contacts mounted on each of them, said scales being marked with known derivations of angles and being movable along threaded members having a pitch in phase with the pitch of the resistor windings, whereby the resistance values between movable contact settings on each resistor is proportional to the sine, cosine, 1—cosine or secant of the angle to which the scale is set, and means for calculating the hour angle of a heavenly body from the numerator, 1—cos hour angle, after setting the scales to the known derivatives of angles for the other parts of the equation, whereby line of position may readily be determined without the use of mathematical tables.

4. Apparatus for solving a spherical triangle mounted in a housing comprising twin resistance elements connected in parallel to a source of E. M. F., terminals connected to the opposite ends of each of said resistances from one pole of the source and terminals with movable contacts for engaging with each of said resistances from the other pole of the source, a galvanometer for indicating a balanced circuit having a pair of terminal contacts each being movable along one of each of the said resistance elements with respect to the first mentioned movable contacts in the manner of twin potentiometers, said contacts being mounted on trigonometrically calibrated scales rotatably adjustable with respect to fixed index points according to the angular derivations of three known trigonometrical functions of the equation;

$$\frac{1-\cos \text{ hour angle}}{\sec \text{ latitude}} = \frac{\cos (\text{latitude} \pm \text{declination}) - \cos \text{ zenith distance}}{\cos \text{ declination}}$$

each of the three scales for said three known functions of the equation when rotated being adapted to impart movement of one of said movable contacts along said resistances, each of said resistances being coiled in spiral formation of a known pitch, fixed threaded shaft elements for each of said scales to turn upon, the pitch of the threads of said elements being equal to the pitch of the resistance coils so as to regulate turning of the scales in proportion to the resistance values between the setting of the contacts, and answer calculating means comprising a rotatable fourth scale having a main index pointer on the housing and a sub-index pointer, one of said galvanometer contacts being mounted on a rotatable element, said element carrying said sub-index pointer which overlaps the markings of said fourth scale, whereby first separately turning the said fourth scale with respect to said overlapping pointer to set it to latitude±declination and then by rotating said fourth scale together with said rotatable element and contact to set the said fourth scale at the main index when the galvanometer reads zero will give the calculated zenith distance.

5. Apparatus for solving a spherical triangle mounted in a housing with windows formed therein to expose a plurality of scales mounted within the same, said apparatus comprising twin resistance elements connected in parallel to a source of E. M. F., terminals connected to the opposite ends of each of said resistances from one pole of the source and terminals with movable contacts for engaging with each of said resistances from the other pole of the source, a galvanometer for indicating a balanced circuit having a pair of terminal contacts each being movable along one of each of the said resistance elements with respect to the first-mentioned movable contacts in the manner of twin potentiometers, said contacts being mounted on trigonometrically calibrated scales rotatably adjustable with respect to fixed index points, said scales being calibrated according to the angular derivations of three known trigonometrical functions of an equation used in celestial navigation to solve a spherical triangle and determine a line of position, each of the three scales for three known functions of the equation when rotated being adapted to impart movement of one of said movable contacts along said resistances, means calibrated to regulate the turning of the scales and their respective contacts as a function of the number of windings for each resistance, and answer calculating means including a main index point on said housing, a rotatable fourth scale, one of said galvanometer contacts being mounted on a rotatable element for movement along one of said resistances, with respect to another movable contact thereon connected to one pole of said source, said rotatable element including an index pointer overlapping the said fourth scale, means for holding said rotatable element in fixed position until said fourth scale is set to a reading for a known portion of one numerator of the equation, means for automatically determining the algebraic sum of the remaining unknown portion of the numerator, and a controllable driving couple between said fourth scale and said rotatable element, whereby said scale, said element and said galvanometer contact may be jointly moved on one of said resistances until the galvanometer reads zero, at which time said algebraic sum is given on said fourth scale opposite said main index point on the housing.

BRYAN HAROLD CABOT MATTHEWS.

REFERENCES CITED

The following references are of record in the file of this patent:

UNITED STATES PATENTS

| Number | Name | Date |
|---|---|---|
| 2,080,186 | Reymond | May 11, 1937 |
| 2,123,142 | McMaster | July 5, 1938 |
| 1,826,762 | Franklin | Oct. 13, 1931 |
| 2,040,086 | Goodwillie | May 12, 1936 |

FOREIGN PATENTS

| Number | Country | Date |
|---|---|---|
| 722,351 | France | Dec. 29, 1931 |